(12) United States Patent
Oliver et al.

(10) Patent No.: US 11,262,174 B2
(45) Date of Patent: Mar. 1, 2022

(54) CONTROL SYSTEM

(71) Applicant: Olitek PTY LTD, Northgate (AU)

(72) Inventors: James Oliver, Northgate (AU); Simon Benjamin Paech, Strathpine (AU)

(73) Assignee: Olitek Pty Ltd, Queensland (AU)

( * ) Notice: Subject to any disclaimer, the term of this patent is extended or adjusted under 35 U.S.C. 154(b) by 640 days.

(21) Appl. No.: 15/756,299

(22) PCT Filed: Aug. 28, 2015

(86) PCT No.: PCT/AU2015/050503
§ 371 (c)(1),
(2) Date: Feb. 28, 2018

(87) PCT Pub. No.: WO2017/035557
PCT Pub. Date: Mar. 9, 2017

(65) Prior Publication Data
US 2018/0245902 A1    Aug. 30, 2018

(51) Int. Cl.
| F42D 1/10 | (2006.01) |
| G01F 9/00 | (2006.01) |
| G05D 7/06 | (2006.01) |
| G05D 11/13 | (2006.01) |
| G05D 7/00 | (2006.01) |

(52) U.S. Cl.
CPC ............... *F42D 1/10* (2013.01); *G01F 9/00* (2013.01); *G05D 7/00* (2013.01); *G05D 7/0682* (2013.01); *G05D 11/132* (2013.01)

(58) Field of Classification Search
CPC .................. F42D 1/10; G05D 11/132
See application file for complete search history.

(56) References Cited

U.S. PATENT DOCUMENTS

| 3,587,743 A | 3/1971 | Howard |
| 3,964,792 A | 6/1976 | Archibald |
| 5,441,340 A | 8/1995 | Cedillo et al. |
| 5,584,222 A | 12/1996 | Engsbråten et al. |
| 5,672,839 A | 9/1997 | Hooper et al. |
| 5,811,711 A | 9/1998 | Tremblay et al. |
| 7,287,516 B2 | 10/2007 | Elliot et al. |

(Continued)

FOREIGN PATENT DOCUMENTS

| WO | WO-2011106830 A1 * | 9/2011 | ............... F41A 1/10 |
| WO | 2015/140462 A1 | 9/2015 | |
| ZA | 2001/02156 | 9/2001 | |

*Primary Examiner* — Elizabeth Insler
(74) *Attorney, Agent, or Firm* — Renner, Otto, Boisselle & Sklar, LLP

(57) ABSTRACT

A control system for controlling operation of a fluid delivery system that includes a first and second pumps for delivering first and second fluids for mixing. A controller includes a first pump map having a first pump flow rate mapped against a control output signal, and a second pump map having a second pump flow rate mapped against a control output signal. The controller determines the control output signal for the first pump to obtain a desired flow rate from the first pump, and the control output signal for the second pump to obtain a target flow rate and a target percentage of the second fluid relative to the first fluid or a target percentage of the second fluid relative to an overall fluid flow. The output signals for the first and second pumps are determined using the first and second pump maps.

17 Claims, 4 Drawing Sheets

(56) References Cited

U.S. PATENT DOCUMENTS

| | | |
|---|---|---|
| 9,989,344 B2* | 6/2018 | Zank .................... C06B 23/004 |
| 2004/0106355 A1 | 6/2004 | Lujan et al. |
| 2010/0021313 A1 | 1/2010 | Devan et al. |
| 2015/0168116 A1 | 6/2015 | Halander et al. |
| 2016/0047398 A1 | 2/2016 | Cho et al. |

* cited by examiner

CONTROL SYSTEM

This application is a national phase of International Application No. PCT/AU2015/050503 filed Aug. 28, 2015 and published in the English language.

TECHNICAL FIELD

The present invention relates to a control system and method for controlling a fluid delivery system.

BACKGROUND ART

Control systems are widely used to control fluid flow rates and pressures through pipes and hoses in fluid delivery systems. For example, many large scale chemical plants have piping systems that supply different fluids to reaction vessels. The fluids must be supplied to the reaction vessels at desired flowrates and in desired proportions to ensure that the required reactions take place in the reaction vessels to obtain a desired product flow rate from the reaction vessel that includes minimal unreacted reactants or unwanted by-products.

Conventional control systems used in chemical plants typically include pressure transducers and flowrate measurement devices that provide information back to controllers. The controllers will typically compare the measured parameters of pressure and flowrate against desired target pressures on flowrates. The controllers will then send control output signals to pumps and/or control valves to thereby control the flow rate and the pressure. Conventional feedback control schemes are typically used in such chemical plants. It will be understood that chemical plants are designed to be operated at effectively steady-state conditions to optimise output and conventional feedback controllers are very good at controlling operation around steady-state conditions.

However, some fluid delivery systems undergo repeated start-up processes. Control of such systems has been found to be problematic. For example, in explosives blasting in mines that utilise explosive compositions prepared on-site, a fluid delivery system can be used to mix components of an explosive mixture together and to deliver those components via a pipe or a hose to a drill hole in the mine. In such fluid delivery systems, a main pump supplies a main product flow. Additional pumps are also provided. The additional pumps are typically trace chemical dosing pumps that inject trace chemicals at desired locations of the process to form the quantities and final mixture dictated by the recipe for a particular explosive mixture. The flow of the trace pumps is usually determined as a mass percentage of the flow of the main pump. There may also be a water pump that is used for lubrication or flushing and the water is generally controlled at a predefined flowrate.

A shear valve or back pressure valve may also be incorporated into the flow delivery system to close against the product flowing in the piping. This flow restriction causes the components to shear within the piping, agitating the components and forcing them to mix. The shear valve is often referred to as a back pressure valve and is typically controlled with air pressure or hydraulic pressure. The shear valve or back pressure valve in known systems of this type is typically a "set and forget" valve, such that the position of the shear valve was set prior to fluid delivery commencing and not adjusted during fluid delivery.

The final dosed and sheared/mixed product would usually be injected through a delivery hose to fill a long and slender cavity, such as a drill hole in a rock face or ore body. A hose handling device would normally withdraw the hose from the hole at a desired rate such that, as the explosive mixture fills the hole, the hose is withdrawn within a required time. The explosive mixture may comprise a mixture that expands once it has been discharged from the hose. In this case the withdrawal of the hose needs to be adjusted to compensate for the final product expansion. The speed at which the hose is withdrawn from the drill hole has conventionally been determined by trial and error methods.

The pumping of a single hole is called a "shot". Each shot can be as long as a number of minutes in some modes, but can also be as short as 3 seconds in other modes. The short time requirement often leaves no time for traditional control methods to be effective. Each pump in the fluid delivery system in short shots is started simultaneously and stopped simultaneously, at the start and the end of the shot, respectively. The trace chemicals need to be pumped at a set ratio to the main product flow, as dictated by the desired explosive recipe mixture, to achieve a final mixed product density after a desired time. Although the main product flowrate is controlled to achieve a desired flowrate, the trace chemicals also need to match the desired flowrate by a specified percentage of flow, whilst also taking into account any fluctuations or speed alterations to the main pump. Any change in the setup of the main product pump will affect all of the chemicals as there is a need to adjust the flowrate of the trace chemical pumps to match the percentage of flow of the changing flow of the main pump.

Unfortunately, when short shot times are required, conventional control methodologies are not able to achieve the requisite level of control over the flowrate, composition and backpressure in the fluid delivery system.

It will be clearly understood that, if a prior art publication is referred to herein, this reference does not constitute an admission that the publication forms part of the common general knowledge in the art in Australia or in any other country.

SUMMARY OF INVENTION

The present invention is directed to a control system and to a method for controlling and fluid delivery system, which may at least partially overcome at least one of the above-mentioned disadvantages or provide the consumer with a useful or commercial choice.

With the foregoing in view, the present invention in one form, resides broadly in a control system for controlling operation of a fluid delivery system, the fluid delivery system including at least a first pump for delivering a first fluid and a second pump for mixing a second fluid with the first fluid, the control system including a controller, the controller including a first pump map for the first pump, the first pump map having a first pump flow rate mapped against one or more variables including a control output signal, the controller including a second pump map for the second pump, the second pump map having a second pump flow rate mapped against one or more variables including a control output signal, the controller determining the control output signal for the first pump to obtain a desired flow rate form the first pump, the controller determining the control output signal for the second pump to obtain a target flow rate and a target percentage of the second fluid relative to the first fluid or a target percentage of the second fluid relative to an overall fluid flow, the respective control output signals for the first pump and the second pump being determined using the first pump map and the second pump map.

In one embodiment, the controller determines a control output signal from the first pump map for startup of the first pump and the controller determines a control output signal from the second pump map for startup of the second pump. By using the pump maps to determine a control output signal on start-up, the pumps should startup close to the desired pump speed or desired operational flow rate. After startup, the controller may incrementally adjust the operation of the pump if one or more sensors indicate that the flowrate is not at the desired flowrate.

In one embodiment, the first pump map for the first pump maps the first pump fluid flow rate against a controller output signal and pressure. In one embodiment, the pressure comprises a back pressure.

In one embodiment, the second pump map for the second pump maps the second pump fluid flow rate against a controller output signal, and pressure. In one embodiment, the pressure comprises a back pressure.

In some embodiments, the delivery system may comprise additional pumps, and the controller includes a pump map for each additional pump. The additional pumps may comprise one or more pumps to deliver and mix additional fluids with the first fluid, with the additional fluids being provided at a rate such that a target percentage of the additional fluids relative to the first fluid or relative to an overall fluid flow rate is obtained.

In one embodiment, the control output signal controls speed of the pump. In another embodiment, the control output signal controls a control valve that affects and controls fluid flow from the pump. In a further embodiment, the control output signal controls both the speed of the pump and the control valve that affects and controls fluid flow from the pump.

In some embodiments, the control system receives a signal from a flow measurement device for measuring flow from the first pump and/or the second pump, the flow measurement device sending a signal to the controller indicative of the measured flow of the first fluid and/or second fluid, the controller comparing the measured flow of the first fluid and/or the second fluid with the target flow, the controller adjusting a control output signal if the measured flow of the first fluid and/or the second fluid differs from the target flow.

Operation of the control system on the fluid delivery system will now be described. Each pump, when initially starting, requires a target delivery flowrate, which is governed by the required output flowrate and the recipe of the mixture to be obtained. For the first pump, the recipe will specify a desired flowrate. For the additional pumps that typically deliver trace chemicals, the flowrate is typically a percentage flowrate compared to the actual flowrate of the first fluid. Trace fluid flow rates are then calculated by the control system. This target flowrate is looked up on the pump maps in relation to the required variables and the required pump control signal output is then determined from the respective pump maps. Once the required pump output signals have been determined, the pumps are started and set to the required pump speed by the control output signals. Once this pump speed has been reached after a specified ramp up time, the system will look to the measured flow or the measured speed of the pump, will compare those variables to the required flow set point or speed and will then start to adjust the output to ensure the required flow is maintained.

After the pumps stop pumping, the last known pump speed for the desired flow is cached into the controller. This pump speed can be utilised again when the pump is restarted, to provide the required flow. However, this could not be used if the flow target or the recipe has been altered. In these circumstances, the control system will again perform a look up of the pump maps to determine the required output signals for pump start-up.

Use of pump maps to control operation of the pumps is advantageous in that short period pumping (such as less than 10 second pumping sequences) can occur with increased accuracy. It will be understood that short period pumping sequences are difficult to control with feedback systems as feedback systems typically do not respond quickly enough for such short pumping times. Embodiments of the present invention also allow the system to continue operation if any of the flow or speed feedback devices fail. In feedback failure mode, the control system does not measure the actual flow or adjust speed output, rather the dosing of the trace chemicals is carried out purely from the data on the pump maps for the entire shot. This also opens up an opportunity for a simplified and cheaper alternative for a programmable system without feedback control to achieve more accurate recipes.

Each pump in the fluid delivery system has its own pump map. Each pump speed is calculated separately, and each pump operates semi-independently. Each pump can be run independently, however the required flow set points are calculated based upon the required flows of the other pumps in the flow delivery system.

In some embodiments, the fluid delivery system includes a back pressure valve to control back pressure downstream of the first fluid pump. The back pressure valve may also assist in shearing and mixing the components of the fluid flow together. The controller may have a back pressure valve map, the back pressure valve map having a back pressure control output signal mapped against fluid flow and/or pressure, the controller sending a back pressure control output signal to the back pressure valve to obtain a desired pressure and flow rate in the fluid delivery system, the back pressure control output signal being been derived from the back pressure valve map.

In one embodiment, the fluid delivery system includes a pressure sensor that senses a pressure and sends a pressure signal to the controller, the controller comparing the pressure signal against a target pressure, the controller adjusting the back pressure control output signal if the pressure signal indicates that the pressure is not at the target pressure.

In one embodiment, if the pressure signal indicates that the pressure is not at the target pressure, the controller incrementally adjusts the back pressure control output signal. Further incremental adjustments to the back pressure control output signal may be made should the pressure sensor continue to indicate that the pressure is not at the target pressure, until the target pressure is obtained.

In one embodiment, at start-up, the controller will look at the required backpressure valve control signal in the backpressure valve map that is required to obtain the desired main product flow and required pressure. Once the backpressure valve control signal output is derived from the map, the control signal is sent to the backpressure valve. The system will look at the measured pressure, compare the measured pressure to the required pressure set point and will then start to adjust the output to ensure the required pressure is accurate.

A second mode of operation may be used in situations where the fluid delivery system is used under a large backpressure through the setup of the equipment (such as a long hose) or through an environmental cause (such as a large head caused by pumping vertically). In these circumstances, there is a large amount of backpressure upon start-up of the system. This can lead to over pressure situations and can also provide an inaccurate map upon start-up. To compensate for this, the system may start with the backpressure valve being set to a lower value. The backpressure valve is then slowly closed until the required backpressure is reached. Once the required pressure is reached, the backpressure valve will operate as normal, as described above.

The controller may control operation of the pumps and the back pressure valve to obtain the target back pressure upstream of the back pressure valve and the target flow rate of fluid.

In some embodiments, the fluid delivery system delivers the fluid through a hose and the hose is retracted as fluid is delivered from the hose, the speed at which the hose is retracted is controlled by the controller.

In some embodiments, the controller has a hose retractor map, the hose retractor map having a hose speed output signal mapped against hose speed, the controller calculating a required hose speed to retract the hose, the controller deriving a hose speed output signal from the hose retractor map, the controller sending the hose speed output signal to a hose retractor.

In one embodiment, the fluid may be delivered through a hose to a hole or cavity drilled in a mine. It may be desirable to withdraw the hose from the cavity as the fluid fills the hole or cavity. In such embodiments, the speed at which the hose is withdrawn from the hole or cavity may be controlled to a desired rate. In this embodiment, the fluid delivery system may be provided with a hose retractor, with the speed of operation of the hose retractor being controlled.

The hose retractor may be controlled by a controller having a hose retractor map, the hose retractor map having hose speed output signal mapped against hose speed, the controller calculating a required hose speed to withdraw the hose, the controller deriving a hose speed output signal from the hose retractor map, the controller sending the hose speed output signal to the hose retractor.

In a second aspect, the present invention provides a method for controlling operation of a first pump and a second pump in a fluid delivery system, the method comprising providing a first pump map in a controller, the first pump map having a first pump flow rate mapped against one or more variables including a control output signal, providing a second pump map in the controller, the second pump map having a second pump flow rate mapped against one or more variables including a control signal output, entering a target delivery flow rate into the controller, entering or determining a percentage of the second fluid flow relative to the first fluid flow or relative to an overall fluid flow in the controller, wherein the controller determines a control signal output from the first pump map to control operation of the first pump to obtain a target first fluid flow rate and the controller determines a control signal output from the second pump map to control operation of the second pump to obtain a target percentage of the second fluid relative to the first fluid or a target percentage of the second fluid relative to an overall fluid flow.

In one embodiment, the controller determines a control output signal from the first pump map for startup of the first pump and the controller determines a control output signal from the second pump map for startup of the second pump. By using the pump maps to determine a control output signal on start-up, the pumps should startup close to the desired pump speed or desired operational flow rate. After startup, the controller may incrementally adjust the operation of the pump if one or more sensors indicate that the flowrate is not at the desired flowrate.

Other or additional steps in the method of the present invention will be apparent to the skilled person from the description provided of the first aspect of the present invention.

In one embodiment, the control output signal controls speed of the pump. In another embodiment, the control output signal controls a control valve that affects and controls fluid flow from the pump. In a further embodiment, the control output signal controls both the speed of the pump and the control valve that affects and controls fluid flow from the pump.

The pump maps may comprise a lookup table. In other embodiments, the pump maps may comprise three-dimensional contour maps. The pump maps may map flow rate for a pump against pressure and control signal output. Control signal output may control pump speed, or it may control a control valve that regulates fluid flow out of the pump, or it may control both.

The backpressure control valve map may map pressure against flow rate and backpressure control signal output. The backpressure control valve map may comprise a lookup table in which pressure is listed against flow rate and signal output.

The controller may comprise a programmable logic controller. The controller may have a computer memory. The pump maps and other maps may be stored in the computer memory. The controller may comprise a single controller or it may comprise two or more separate controllers. If two or more separate controllers are used, the two or more separate controllers may be linked with each other. The controller may be able to compute flow rates from the second pump and additional pumps that are necessary to obtain the desired mixing percentages of the second fluid and additional fluids.

In some embodiments, the controller may be able to determine the required hose retraction speed at which to withdraw the hose from a hole or cavity.

Throughout this specification, the term "fluid" shall be taken to include a liquid, a slurry, an emulsion, a mixture of liquid and gases, a suspension of solid particular material in a liquid, a gel or indeed any liquid or gel containing material that can be caused to flow by pumping it through a pipe or a hose.

In a third aspect, the present invention provides a method of controlling operation of a pump that delivers a fluid to a hole or cavity in a mine, the method comprising providing a pump map in a controller, the pump map having a pump flow rate mapped against one or more variables including a control output signal, entering a target delivery flow rate into the controller, wherein the controller determines a control signal output from the pump map to control operation of the pump to obtain a target first fluid flow rate and the control signal output controls flow rate from the pump. In one embodiment, the controller determines a control output signal from the pump map for startup of the pump. By using the pump map to determine a control output signal on start-up, the pump should startup close to the desired pump speed or desired operational flow rate. After startup, the controller may incrementally adjust the operation of the pump if one or more sensors indicate that the flowrate is not at the desired flowrate.

The present invention also encompasses a fluid delivery apparatus comprising one or more pumps and a control system is described above. The fluid delivery apparatus may also include a back pressure control valve and a control system for controlling the backpressure control valve, as described above. The fluid delivery apparatus may also comprise a hose retraction device and a control system for controlling speed of hose retraction, as described above.

The fluid delivery apparatus may comprise an on-site mixing apparatus for preparing explosive compositions. The fluid delivery apparatus may be mounted to a vehicle, such as a truck. The vehicle may be moved as desired to enable the fluid delivery apparatus to be conveniently located for ease of use.

In a further aspect, the present invention provides a control system for controlling operation of a pump that delivers a fluid to a hole or cavity in a mine, comprising a controller having a pump map, the pump map having a pump flow rate mapped against one or more variables including a control output signal, wherein the controller determines a control signal output from the pump map to control operation of the pump to obtain a target fluid flow rate.

In yet a further aspect, the present invention provides a control system for an apparatus supplying a fluid via a hose to a bore comprising a controller, the controller receiving data relating to drill depth of the bore or volume of the bore, the controller calculating a required pumping volume and hose speed and distance to insert and retract the hose, the controller deriving a hose speed output signal from a hose retractor map, the controller sending the hose speed output signal to the hose retractor. In one embodiment, the controller may receive the information relating to drill depth of the bore or volume of the bore by manual input of the information. In another embodiment, the controller may receive the information relating to drill depth of the bore or volume of the bore automatically from the machine creating the bore.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

Those skilled in the art will appreciate that the attached drawings have been provided for the purposes of describing preferred embodiments of the present invention. Therefore, it will be understood that the present invention should not be considered to be limited solely to the features as shown in the attached drawings.

Figure 1:
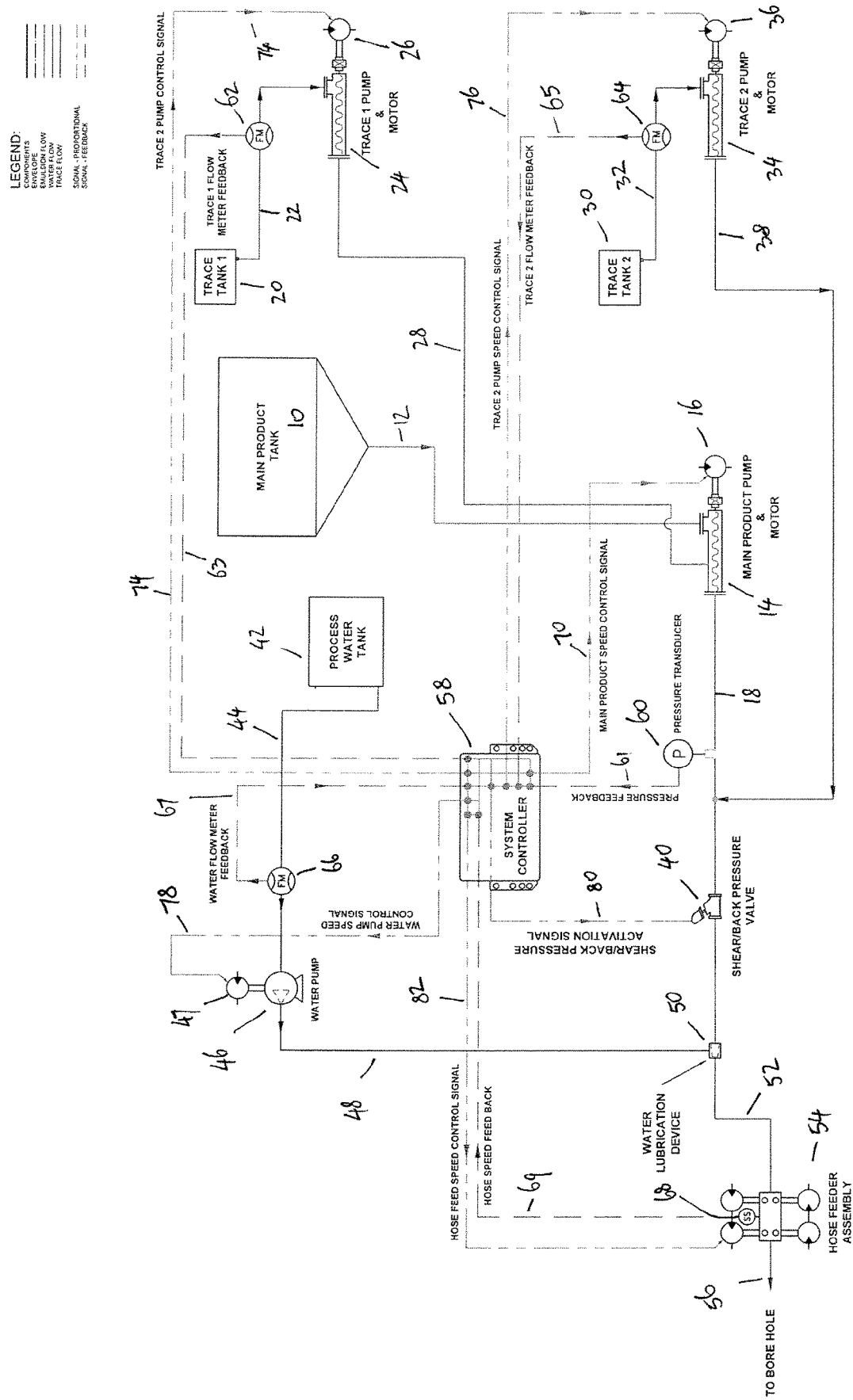
FIG. 1 shows a processing control flow diagram of a fluid delivery system or fluid delivery apparatus that incorporates a control system in accordance with the present invention.

FIG. 1 shows a process control flowsheet for an apparatus for delivering a fluid. In the specific embodiment shown in FIG. 1, the apparatus is designed for delivering an emulsion explosive to a shot hole drilled into a mine or an ore body. The apparatus shown in FIG. 1 is particularly useful for preparing and delivering on-site explosives. When delivering such emulsion explosives to a shot hole, it is often necessary to mix the main explosive emulsion with one or more trace chemicals, with the trace chemicals being present in a specified percentage of the main emulsion. Close control of the amount of trace chemicals that are added is important.

The apparatus for delivering the fluid shown in FIG. 1 comprises a main product tank 10. Main product tank 10 contains the first fluid. The main product tank 10 is connected by a line 12 (which may be a pipe or a hose) to a first pump 14. The first pump 14 is operated by first pump motor 16. An outlet line 18, in the form of a pipe, is connected to an outlet of the first pump 14.

The apparatus further comprises a further tank 20 that contains a first trace chemical. The tank 20 is connected via line/pipe 22 to a second pump 24. A second pump motor 26 operates the second pump 24. An outlet line/pipe 28 is connected to an outlet of second pump 24 and outlet line 28 delivers the first trace chemical to the first pump 14. The apparatus further comprises another tank 30. Tank 30 contains a second trace chemical. A line/pipe 32 connects the tank 30 to a third pump 34. Third pump 34 is operated by a third pump motor 36. An outlet line/pipe 38 is connected to an outlet of the third pump 34 and outlet line 38 delivers the second trace chemical to the line 18.

In order to control backpressure in line 18, a backpressure valve 40 is provided in line 18. Backpressure valve 40 ensures that an appropriate backpressure is obtained in line 18. Backpressure valve 40 also shears the fluid flowing through the valve, to thereby intimately mix the components together.

The apparatus further comprises a process water tank 42 that is connected via line/pipe 44 to a water pump 46. Water pump 46 delivers water via line 48 to a water lubrication device 50. The water can form a barrier between the mixed product and delivery hose for purposes of lubrication or can also be mixed with the fluid flowing through line 18 to form a final fluid that flows through line 52. Line 52 may be in the form of a hose that is connected to a hose feeder assembly 54. Hose feeder assembly allows a hose 56 to be extended and retracted to enable the hose to be positioned inside a borehole and to be retracted from the borehole as the product fluid flows out of the hose into the borehole.

The apparatus also includes a system controller 58. System controller 58 may be in the form of a programmable logic controller having computer memory and appropriate calculation algorithms programmed therein. The system controller 58 receives inputs from a number of sensors or transducers and sends control signals to control operation of the first, second and third pumps and the backpressure valve. The controller also controls operation of the hose feeder assembly 54. Although FIG. 1 shows the system controller 58 as comprising a single unit, it will be appreciated that the system controller 58 may comprise a number of separate controllers. If a number of separate controllers are used, the controllers may be linked to each other and may be able to share data with each other.

As mentioned above, the apparatus includes a number of sensors and transducers. In particular, the apparatus includes a pressure transducer 60 that monitors pressure in the line/pipe 18. The pressure in the line 18 may be varied by controlling the flow rate of fluid through pipe 18 and by controlling the position of the backpressure valve 40. Pressure transducer 60 provides a signal to the system controller 58 that is indicative of the pressure being measured in line 18. It will be appreciated that the signals from all of the sensors or transducers used in the apparatus shown in FIG. 1 may be sent to the controller through appropriate wiring or by using wireless transfer means. The signal being sent from the pressure transducer 62 the system controller 58 is shown in FIG. 1 as being sent along wire 61.

The apparatus also includes a flow meter 62 that measures the flow of fluid from the tank 20 that holds the first trace chemical to the second pump 24. It will be appreciated that the flow rate measured by flow meter 62 is the same as the flow rate leaving second pump 24 through line 28. Another embodiment may have the flow meter installed in line 28 to measure the flow from the pump to the main product flow 18. A signal indicative of the flowrate being measured by flow meter 62 is sent via wire 63 to system controller 58. The apparatus also includes a flow meter 64 that measures the flowrate of the second trace chemical flowing from tank 32 to third pump 34. It will be understood that the flow rate measured by flow meter 64 is the same as the flowrate of second trace chemical that is flowing through outlet line 38 from pump 34. A signal indicative of the flowrate being measured by flow meter 64 is sent via wire 65 to the system controller 58.

A further flow meter 66 is positioned in line 44 in order to measure the flowrate of process water that is provided to the water lubrication device 50. A signal indicative of the flowrate being measured by flow meter 66 is sent via wire 67 to the system controller 58.

The hose feeder assembly 54 also includes a hose speed sensor 68 that measures the speed of movement of the hose feeder assembly and provides a signal indicative of that speed via wire 69 to the system controller 58.

The controller 58 outputs control signals to control operation of the various pumps, to control operation of the backpressure valve 40 and to control operation of the hose feeder assembly 54. For example, the controller 58 sends a control output signal 70 to control operation of the first pump motor 16 (which, in turn, controls operation of this pump 14). Similarly, controller 58 sends a control output signal 74 to control operation of the second pump motor 26. The controller 58 sends a control output signal 76 to control operation of the third pump motor 36. The controller 58 sends a control output signal 78 to control operation of a water pump motor 47 (which controls operation of the water pump 46).

The controller 58 also sends a control output signal 80 to control operation of the backpressure valve 40. The controller 58 also sends a control output signal 82 to control operation of the hose feeder assembly 54. In some embodiments, the controller can receive data relating to drill depth of the bore or volume of the bore. The controller can use that data to calculate the required pumping volume of fluid, the hose speed and the distance to insert and retract the hose to ensure proper filling of the bore. The controller derives a hose speed output signal (that is used to control operation of the hose retractor) from a hose retractor map. The hose retractor map may be loaded into the computer memory of the controller. The controller sends the hose speed output signal to the hose retractor. The controller may receive the information relating to drill depth of the bore or volume of the bore by manual input of the information by an operator. Alternatively, the controller may receive the information relating to drill depth of the bore or volume of the bore automatically from the machine creating the bore. The machine creating the bore may send this information to the controller wirelessly, via a cable or via a computer file uploaded to the controller, such as from a memory stick or the like.

Figure 2C:
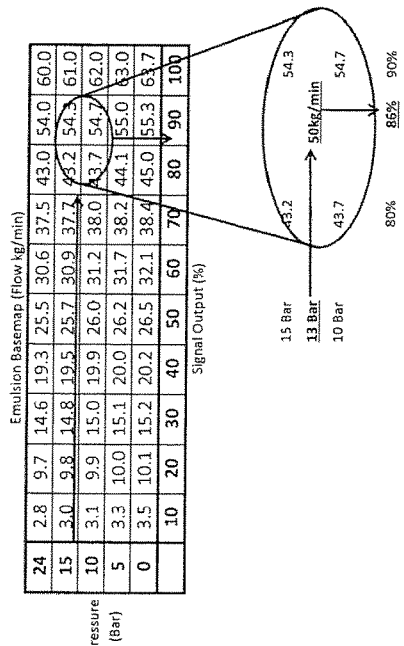
FIG. 2C shows an example showing an interpolation step utilised to determine a pump control signal output for a desired flow rate in pressure using the pump map shown in FIG. 2A.
Figure 2A:
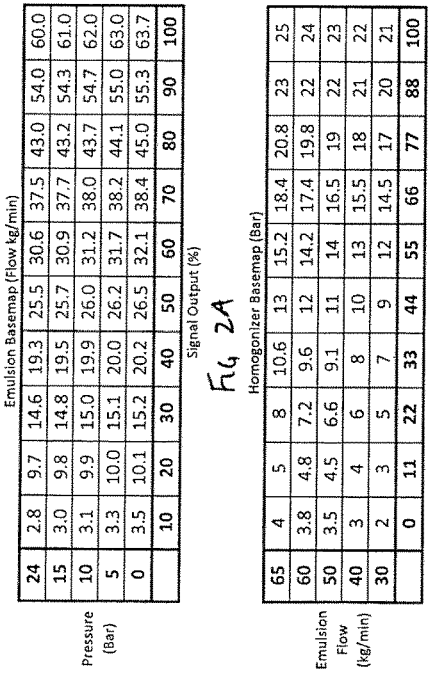
FIG. 2A shows a pump map that may be using the apparatus shown in FIG. 1.

Unlike conventional control systems for controlling pumping of fluids to holes or cavities in a mine or an ore body, the controller 58 has a number of different maps that map the characteristics of the various pieces of equipment that are being controlled by the controller. FIG. 2 shows examples of some of these maps. FIG. 2A shows a pump map for the first pump 14. The pump map shown in FIG. 2A is in the form of a lookup table that has pressure shown on the Y-axis and percentage control signal output shown on the X-axis. The pump map shown in FIG. 2A is determined by measuring the flowrate of the first fluid being derived from the first pump 14 by operating the pump at the various combinations of pressure and percentage signal output as shown in FIG. 2A. Similar pump maps are determined for the second pump 24, the third pump 34 and the fourth pump 46. The pump map for each pump is loaded into the computer memory included in controller 58.

Figure 2B:
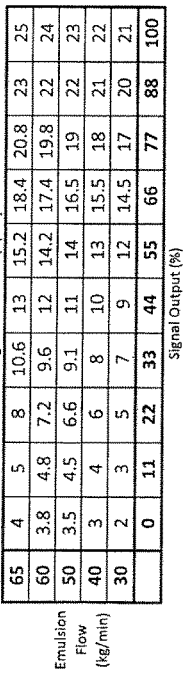
FIG. 2B shows a backpressure control valve map that may be used in the apparatus shown in FIG. 1.

FIG. 2B shows a back pressure valve map for the backpressure valve 40. The backpressure valve map 40 has the flowrate through the valve shown on the Y-axis and the signal output shown on the X-axis. The backpressure arising from the various combinations of flow rates and signal outputs shown in FIG. 2B is determined and entered into the map as shown in FIG. 2B. The backpressure valve map shown in FIG. 2B is loaded into the computer memory included in controller 58.

The various maps for the pumps, backpressure valve and hose feeder assembly that are loaded into the computer memory included in controller 58 allow for very rapid determination of control signal output from the desired or required conditions. An example of how the control signal output can be determined for a particular set of conditions is shown in FIG. 2C. In this figure, it is desired to find the control signal output required to obtain a pump speed that will deliver a flow rate of 50 kg per minute at 13 bar pressure from the first pump 14. As can be seen in FIG. 2C, the pump map has pressure values of 10 and 15 bar. Therefore, it is necessary to conduct an interpolation to obtain a flowrate at 13 bar. Similarly, in order to obtain a flowrate of 50 kg per minute at 13 bar, it is necessary to move across the table and then to interpolate between the various values that have been circled (which values effectively surround the desired flowrate of 50 kg per minute at a pressure of between 10 and 15 bar). Interpolation between the pressure reading and the determined flowrate included in the pump map result in a signal output of 86% being required to obtain the flowrate of 50 kg per minute at 13 bar. Thus, use of the pump map shown in FIG. 2C enables the controller 58 to very rapidly determine that a control output signal 70 should be sent to the pump motor 16, with the control output signal 70 being at 86% of the maximum signal output. This will then operate the pump motor 16 at 86% of its maximum speed.

The controller 58 will use the other maps and complete similar interpolations/calculations to determine all other output signals that need to be sent to the pump motors, to the backpressure valve 40 and to the hose feeder assembly 54.

The pump maps can be obtained because a typical product pump will deliver a consistent and repeatable flow for a set speed and backpressure. This information can be mapped onto the pump map for each pump. Each pump map for each pump contains three variables, these being the drive speed output (or control signal output, ranging from 0% to 100%), the backpressure the pump is pumping against and the resulting flow at each value of drive speed output and backpressure.

The pump maps can be obtained through the use of an automated function. For each pump, the machine will operate the pump and control the variables to reach all operating conditions which are recorded on the pump map. For example this can be achieved for the first pump by starting the pump at the lowest speed on the pump map, starting the back pressure valve at 0%, slowly increasing the back pressure valve to 100% and recording the flows seen at each required pressure, stopping the pump and back pressure valve and restarting the pump at the next speed increment shown on the pump map, starting the back pressure valve at 0% and slowly increasing the back pressure valve to 100%, again recording all flows seen at each required pressure. This is repeated for all speeds and pressures shown on the pump map. The user is also able to manually enter all values if required, or can adjust the recorded values, ensuring a smooth and correct pump map is recorded.

Each pump, when initially starting, requires a target delivery flowrate, which is governed by the pumping recipe. For the first pump 14, the pumping recipe will specified a desired flowrate, typically in kilograms per minute or litres per minute. For the second pump 24 and third pump 34, which deliver trace chemicals to the first fluid being pumped by the first pump 14, the flowrate is determined as a percentage flowrate compared to the actual flowrate of the first fluid. Trace flow rates are then calculated by the controller 58. For example, if the first pump has a desired flowrate of the first fluid of 50 kg per minute and the first trace chemical delivered by the second pump is to comprise 1% of the flow of the first fluid, the controller calculates that the first trace chemicals should be delivered by the second pump at a rate of 0.5 kg per minute. This flowrate for the second pump is then looked up on the pump map for the second pump in relation to the required back pressure and the required pump speed output is then determined by the controller (using interpolation between map values, if required). The controller then sends the appropriate output control signal 74 to the second pump motor 26 to control operation of the second pump 24.

A similar procedure is conducted for third pump 34 in order to control the desired flowrate of the second trace chemical.

Once the required output speed for each pump has been determined, the pumps are started and set to the required pump speed from the derived map value. Once this pump speed has been reached after a specified ramp up time (which could be very short or nil), the flowrate of the trace chemicals will be measured by the flowmeters 62, 64 and compared to the required flow set point. If there is any variance, the controller 58 will then start to adjust the control signal outputs to ensure the required flow is reached. Although not shown in FIG. 1, a flow measuring device may also be included in line 12 to enable the flow of the first fluid to be measured. The flow measuring device in line 12 may send a signal indicative of the flowrate of the first fluid to the controller 58 and the controller 58 may then adjust the control signal 70 that is used to control pump 14 to control the flowrate through outlet line 18.

Once a shot has been completed, the pumps are stopped. The last known pump speed for the desired flow is cached in the memory of the controller 58. This pump speed is utilised again when the pump is restarted, to provide the required flow. This is, of course, contingent upon the required flow for the next shot being the same flow as the previous shot. This is a relatively common practice in blasting techniques. However, the last known pump speed cannot be used if the flow target, the machine setup or the recipe has been altered from one shot to the next shot. In this event, the controller will again perform the appropriate interrogation of the pump maps to determine the pump start-up conditions.

The use of pump maps in the present invention allows for short period (for example, less than 5 seconds) pumping sequence to occur with increased accuracy when compared to feedback systems which do not respond quickly enough for such short pumping periods. The use of pump maps also allows the system to continue operation if any of the flow or speed feedback devices fail. In feedback failure mode, the system does not measure the actual flow or adjust speed output. Rather, operation of the pumps (and dosing of the respective fluids) is carried out purely from the data on the pump maps for the entire shot. This also opens up an opportunity for a simplified and cheaper alternative for a programmable system without feedback control to achieve more accurate recipe mixtures.

Each pump in the apparatus has its own pump map. Each pump speed for each pump is calculated separately, with each pump operating semi-independently from the other pumps. Each pump can be run independently, however the required flow set points are calculated based upon the required flows of the other pumps in the apparatus.

The backpressure valve 40 is used to control backpressure in the main product line 18. The backpressure and the main product flowrate are key variables in the process. Therefore, it is important in the specific embodiment shown in FIG. 1 to ensure that both the back pressure valve 40 and the first pump 14 are controlled whilst ensuring they are both linked via the controller 58.

As described with reference to FIG. 2B, the backpressure valve 40 has a backpressure valve map that has three variables, these being flowrate through the valve, the back pressure valve output signal (ranging from 0% to 100%) and the resulting system pressure. The backpressure valve map is loaded into the controller 58.

The backpressure valve, in one mode of operation, will start by looking at the required backpressure valve position, based upon the desired main product flow and required pressure. This is determined from the backpressure valve map. Once the backpressure valve control output signal is derived from the back pressure valve map, the backpressure valve is actuated and the output control signal is sent to it. The system will look to what pressure is measured by pressure transducer 60, will compare the measured pressure to the required pressure set point and will then start to adjust the output to ensure that the required pressure is accurate.

The backpressure valve map can also be used in pressure feedback failure mode.

In situations where a large backpressure is present in the outlet lines, such as can occur where a long outlet hose is used or where the product fluid is to be pumped vertically (which causes a large head to be generated) a modified control system for controlling the backpressure valve 40 may be required. As there is a large amount of backpressure upon start-up of the system, the backpressure valve 40 will be set to a lower value. The backpressure valve can then be slowly closed by the controller until the required pressure is reached. Once reached, the backpressure valve will operate as described in paragraph [0082] above.

In the embodiment shown in FIG. 1, the controller 58 also includes a hose control map. This allows for start-up of the hose feeder assembly to commence retracting the hose from the hole or cavity at the correct speed. The hose control map only contains a correlation between the host speed output signal 82 and the speed of the hose feeder. A separate control map can be used for both directions that the hose is controlled.

The calculation of the required speed to withdraw the hose from the hole involves determining the volume of the hole or cavity into which the hose is inserted. The hoses are typically inserted into drilled holes in a rock face during underground mining. These holes are roughly cylindrical and are drilled to a predetermined depth and diameter, resulting in a volume of product required to fill the hole at a known density. The controller takes the variables stored for the recipe of the final fluid mixture to calculate the predicted volume of fluid inside the hole. The controller then calculates the required retraction speed of the hose which will fill the hole at the correct density, taking into account the expansion of the product to a lower density, the flowrate of the fluid product into the hole and how full the hole is required to be. With all of these variables, the required hose speed is calculated, the system looks at the required output for the control signal 82 that will achieve this required host speed and the hose feeder assembly operates at the desired hose speed. In this regard, the controller also includes a hose retraction map that comprises a lookup table that correlates hose retraction speed with the percentage output control signal.

Figure 3:
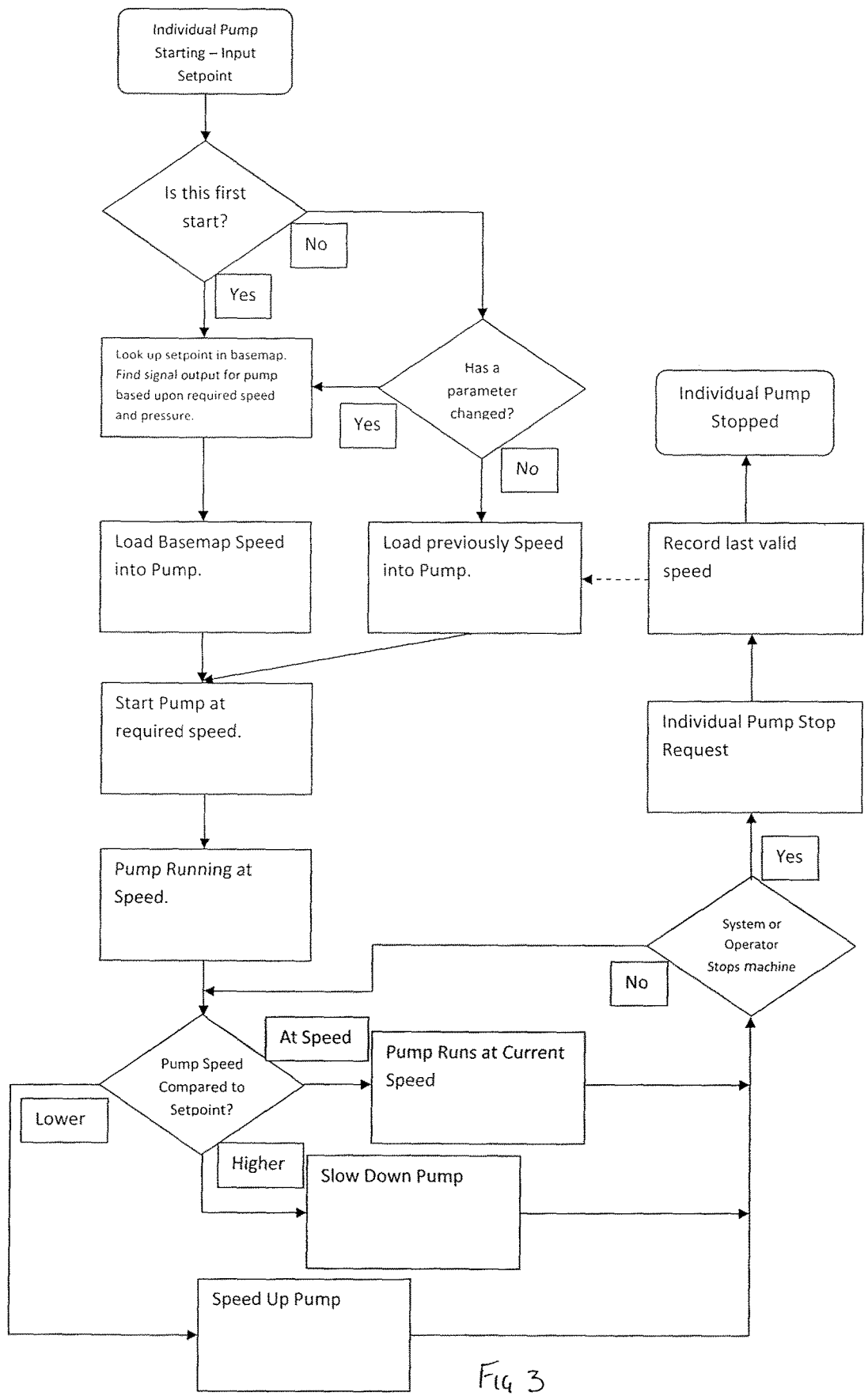
FIG. 3 shows a logic flowchart for controlling a pump in the apparatus shown in FIG. 1.

FIG. 3 shows a logic flowchart that is used to operate and control a pump in the apparatus shown in FIG. 1. This flowsheet is self-explanatory to a person skilled in the relevant art.

Figure 4:
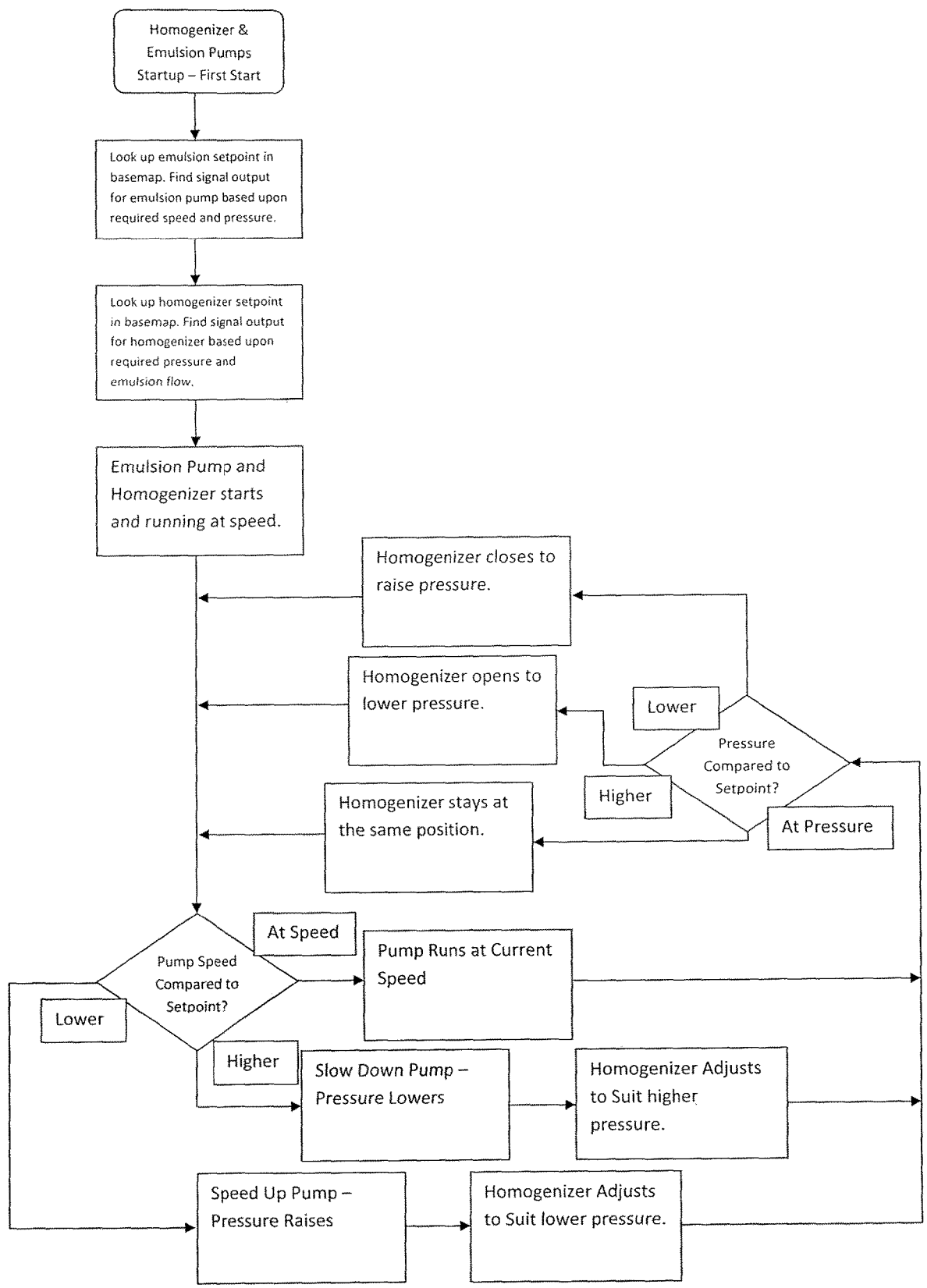
FIG. 4 shows a logic flowchart for control of the pumps and the backpressure valve used in the fluid delivery apparatus shown in FIG. 1.

FIG. 4 shows a logic flowsheet that is used to operate and control the pumps and the backpressure valve (in FIG. 4, the backpressure valve is referred to as the "homogenizer"). Again, this flowsheet is self-explanatory to a person skilled in the relevant art.

The controller 58 may be provided with an interface to enable an operator to input desired inputs. For example, the operator may be able to input the desired flowrate of the final fluid product and the desired back pressure applied by the backpressure valve 40. The controller may allow the operator to input a certain recipe, including the percentage of trace chemicals that are needed to be included in the final fluid product. The operator may also enter the volume of the boreholes. The controller may allow properties of the final fluid product to be entered, or the controller may include information on the properties of the final fluid product incorporated into its computer memory. The interface may comprise a screen and keyboard, or a standalone touchscreen. In some embodiments, the interface may comprise a wireless app that allows a tablet computer or similar, or even a mobile telephone, to enter the requisite input data. Additional data relating to the depth or volume of the bore to be filled with the fluid may also be extracted from the drilling machine that created the holes and loaded into the controller either manually or through automated software.

The present invention uses a fundamentally different control theorem to allow for control of pumps and fluid delivery. The present invention allows accurate control to be established within a very short time period. As a result, the present invention provides significant advantages over conventional feedback controls that have been traditionally used.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A fluid delivery system comprising
at least a first pump for delivering a first fluid and a second pump for mixing a second fluid with the first fluid,
a control system including a controller, the controller including a first pump map for the first pump, the first pump map having a plurality of first pump flow rates mapped against one or more variables including a first pump control output signal, the first pump map including a lookup table, the controller including a second pump map for the second pump, the second pump map having a plurality of second pump flow rates mapped against one or more variables including a second pump control output signal, the second pump map including a lookup table,
the controller being configured to determine the first pump control output signal for the first pump to obtain a desired flow rate from the first pump,
the controller being configured to determine the second pump control output signal for the second pump to obtain a target flow rate and a target percentage of the second fluid relative to the first fluid or a target percentage of the second fluid relative to an overall fluid flow,
the controller being configured such that the respective control output signals for the first pump and the second pump are determined using the first pump map and the second pump map, respectively,
the fluid delivery system further comprising one or more sensors for determining a first flowrate from the first pump and determining a second flowrate from the second pump, the one or more sensors being configured to send signals relating to the first flowrate and the second flowrate to the controller, or one or more sensors for determining a first pump speed and a second pump speed,
the controller including a comparator for comparing one or more of the first flowrate and the second flowrate or the first pump speed and the second pump speed with a flow set point or speed,
the controller being configured to adjust a control output signal for the first pump or the second pump if the comparator determines a difference between the first flowrate or the second flowrate to the flow set point or a difference between the first pump speed or the second pump speed to the set point pump speed, the controller being configured to use the first pump map and the second pump map to determine the adjusting of the first control output signal or the second control output signal, the fluid delivery system further including a hose through which the fluid is delivered, the hose being retractable as fluid is delivered from the hose, the controller being configured to control the speed at which the hose is retracted, and wherein the controller has a hose retractor map, the hose retractor map having a hose speed output signal mapped against hose speed, the hose retractor map including a lookup table, the controller being configured to calculate a required hose speed to retract the hose, the controller being configured to derive a hose speed output signal from the hose retractor map, and the controller being configured to send the hose speed output signal to a hose retractor.

2. The fluid delivery system as claimed in claim 1, wherein the controller is configured to determine a first pump control output signal from the first pump map for startup of the first pump and the controller is configured to determine a second pump control output signal from the second pump map for startup of the second pump.

3. The fluid delivery system as claimed in claim 1, wherein the first pump map for the first pump is a mapping of the first pump fluid flow rate against a first pump control output signal and pressure and the second pump map for the second pump is a mapping of the second pump fluid flow rate against a second pump control output signal, and pressure.

4. The fluid delivery system as claimed in claim 3, wherein the pressure comprises a back pressure.

5. The fluid delivery system as claimed in claim 1, wherein the fluid delivery system comprises additional pumps, and the controller includes a pump map for each additional pump, the additional pumps comprising one or more pumps to deliver and mix additional fluids with the first fluid, and the controller is configured to cause the additional fluids to be provided at a rate such that a target percentage of the additional fluids relative to the first fluid or relative to an overall fluid flow rate is obtained.

6. The fluid delivery system as claimed in claim 1, wherein the control output signal controls speed of the pump, or the control output signal controls a control valve that affects and controls fluid flow from the pump, or the control output signal controls both the speed of the pump and the control valve that affects and controls fluid flow from the pump.

7. The fluid delivery system as claimed in claim 1, wherein the control system includes a flow measurement device for measuring flow from the first pump and/or the second pump, the flow measurement device being configured to send a signal to the controller indicative of the measured flow of the first fluid and/or second fluid, the controller being configured to compare the measured flow of the first fluid and/or the second fluid with the target flow, and to adjust a control output signal if the measured flow of the first fluid and/or the second fluid differs from the target flow.

8. The fluid delivery system as claimed in claim 1, wherein the fluid delivery system includes a back pressure valve to control back pressure downstream of the first fluid pump and the controller has a back pressure valve map, the back pressure valve map having a back pressure control output signal mapped against fluid flow and/or pressure, the controller being configured to send a back pressure control output signal to the back pressure valve to obtain a desired pressure and flow rate in the fluid delivery system, the back pressure control output signal being derived from the back pressure valve map.

9. The fluid delivery system as claimed in claim 8, wherein the fluid delivery system includes a pressure sensor for sensing a pressure and sending a pressure signal to the controller, the controller comparing the pressure signal against a target pressure, and the controller is configured to adjust the back pressure control output signal if the pressure signal indicates that the pressure is not at the target pressure.

10. The fluid delivery system as claimed in claim 8, wherein the controller is configured to control operation of the pumps and the back pressure valve to obtain the target back pressure upstream of the back pressure valve and the target flow rate of fluid.

11. The fluid delivery system as claimed in claim 1, wherein the controller comprises a programmable logic controller.

12. The fluid delivery system as claimed in claim 1, wherein the controller has a computer memory and the pump maps and other maps are stored in the computer memory.

13. A method for controlling operation of a fluid deliver system having a first pump and a second pump, the fluid delivery system delivering the fluid through a hose and the hose being retracted as fluid is delivered from the hose, the method comprising providing a first pump map in a controller, the first pump map having a plurality of first pump flow rates mapped against one or more variables including a first pump control output signal, the first pump map including a lookup table, providing a second pump map in the controller, the second pump map having a plurality of second pump flow rates mapped against one or more variables including a second pump control output signal, the second pump map including a lookup table, entering a target delivery flow rate into the controller, entering or determining a percentage of the second fluid flow relative to the first fluid flow or relative to an overall fluid flow in the controller, using the controller to determine the first pump control output signal from the first pump map to control operation of the first pump to obtain a target first fluid flow rate, using the controller to determine the second pump control output signal from the second pump map to control operation of the second pump to obtain a target percentage of the second fluid relative to the first fluid or a target percentage of the second fluid relative to an overall fluid flow and wherein a speed at which the hose is retracted is controlled by the controller, using one or more sensors for determining a first flowrate from the first pump and determining a second flowrate from the second pump, the one or more sensors sending signals relating to the first flowrate and the second flowrate to the controller, or using one or more sensors for determining a first pump speed and a second pump speed, using a comparator to compare one or more of the first flowrate and the second flowrate or the first pump speed and the second pump speed with a flow set point or speed, using the controller to adjust a control output signal for the first pump or the second pump if the comparator determines a difference between the first flowrate or the second flowrate to the flow set point or a difference between the first pump speed or the second pump speed to the set point pump speed, the controller using the first pump map and the second pump map to determine the adjusting of the first control output signal or the second control output signal, using the controller to calculate a required hose speed to retract the hose, the controller deriving from a hose retractor map that has a hose speed output signal mapped against hose speed, the hose speed output signal, the hose retractor map including a lookup table, the controller sending the hose speed output signal to a hose retractor.

14. The method as claimed in claim 13, wherein the controller sends a first pump control output signal to the first pump to control operation of the first pump and the controller sends a second pump control output signal to control operation of the second pump.

15. The method as claimed in claim 13, wherein the fluid delivery system includes a back pressure valve to control back pressure downstream of the first fluid pump and the controller has a back pressure valve map, the back pressure valve map having a back pressure control output signal mapped against fluid flow and/or pressure, the controller sending a back pressure control output signal to the back pressure valve to obtain a desired pressure and flow rate in the fluid delivery system, the back pressure control output signal being derived from the back pressure valve map.

16. The method as claimed in claim 13, wherein the controller determines the first pump control output signal from the first pump map for startup of the first pump and the controller determines the second pump control output signal from the second pump map for startup of the second pump.

17. The method as claimed in claim 13, further comprising entering a first pump target flowrate for the first pump into the controller and entering a second pump target flowrate for the second pump into the controller, the second pump target flowrate being entered as a percentage of the first pump target flowrate, using the controller to interrogate the first pump map to determine the first pump output signal to obtain the target first pump target flowrate, using the controller to interrogate the second pump map to determine the second pump output signal to obtain the target second pump target flowrate, starting the first pump and starting the second pump and setting the first pump and the second pump to a speed to deliver the first pump target flowrate and the second pump target flowrate by use of the respective first pump control output signal and the second pump control output signal, determining a measured flow or a measured speed of the first pump and the second pump, comparing the determined measured flow or the measured speed of the first pump and the second pump to the first pump target flowrate and the second pump target flowrate or a first pump target speed for the first pump and a second pump target speed for the second pump, using the controller to adjust the first pump control output signal and/or the second pump control output signal to ensure that the output to the first pump target flowrate and the second pump target flowrate is maintained.

* * * * *